(No Model.)
C. E. W. WOODWARD.
CYCLE WHEEL.
No. 483,373. Patented Sept. 27, 1892.
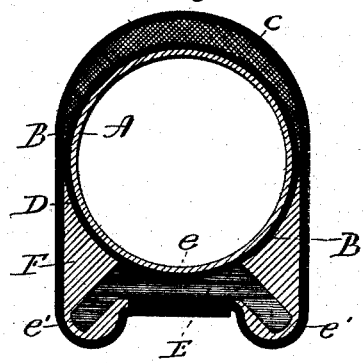
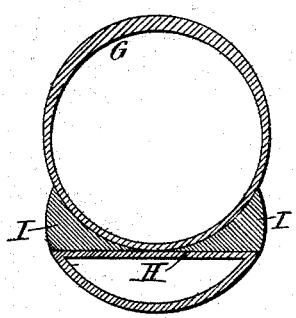 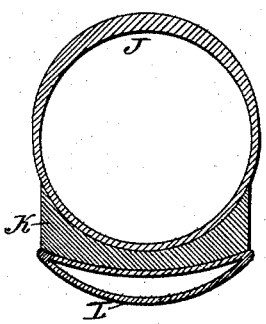 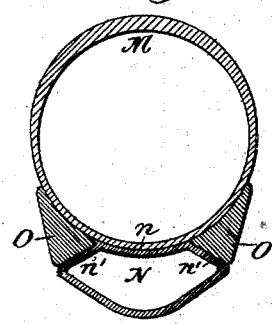
Witnesses
J. H. Shumway
Lillian D. Kelsey
Charles E. W. Woodward
Inventor
By attys
Eddie Seymour

UNITED STATES PATENT OFFICE.

CHARLES E. W. WOODWARD, OF CHICOPEE FALLS, MASSACHUSETTS, ASSIGNOR TO THE OVERMAN WHEEL COMPANY, OF SAME PLACE.

CYCLE-WHEEL.

SPECIFICATION forming part of Letters Patent No. 483,373, dated September 27, 1892.

Application filed April 11, 1892. Serial No. 428,628. (No model.)

*To all whom it may concern:*

Be it known that I, CHARLES E. W. WOODWARD, of Chicopee Falls, in the county of Hampden and State of Massachusetts, have invented a new Improvement in Cycle-Wheels; and I do hereby declare the following, when taken in connection with accompanying drawings and the letters of reference marked thereon, to be a full, clear, and exact description of the same, and which said drawings constitute part of this specification, and represent, in—

Figure 1, a view in transverse section through the hollow tire, rim, and elastic pads of one form which my invention may assume; Figs. 2, 3, and 4, similar views showing modified forms thereof.

My invention relates to an improvement in cycle-wheels, and more particularly to that class thereof having cushion or pneumatic tires, the former being constructed with interior openings for the inward displacement of the rubber and the latter containing compressed air, the particular object of my invention being to provide a construction for supporting such tires laterally, and whereby they are prevented from rolling with the least interference with their cushioning action, and in a manner not only protecting them and the wheel-felly, but also increasing the riding qualities of the wheel by shading, as it were, the yielding tire into the solid rim.

With these ends in view my invention consists in the combination, with a wheel-rim and a hollow rubber tire, of elastic pads or cushions interposed between the same on opposite sides of their centers, and in certain other details of construction and combinations of parts, as will be hereinafter described, and pointed out in the claims.

The tire shown by Fig. 1 of the drawings belongs to the class of pneumatic tires which are designed to receive compressed air and is compound in its structure, comprising an inner rubber tube A, a covering B of cloth therefor, a reinforce C of cloth, canvas, leather, or other equivalent material applied upon the outer periphery or tread of the tube A over the cloth covering B thereof, and an outer wrapping of cloth or rubber D, which entirely incloses the several parts of the tire and has its ends drawn down over the rim E and united under the same. The said rim E comprises a central slightly-concaved bed *e*, upon which the tube A rests, and two outwardly-inclined seats *e' e'*, which support pads or cushions F, made of rubber or equivalent elastic material, and thus interposed between the tire and the rim on opposite sides of the centers thereof, these pads being held in place, as herein shown, by the wrapping F and extended at their inner ends under the said seats to protect the wrapping from the rim. It will be noted that the upper ends of these pads are gradually narrowed until they come to a point, whereby the gradation from the rigid rim to the yielding tire is "shaded," so to speak, making the tire ride very softly. It will also be noted that the main portions of these pads are approximately triangular in cross-section. These pads prevent the tire from rolling laterally and at the same time yield sufficiently to avoid that harshness of action which would be present if they were made of metal or any other unyielding material. They yield both under lateral and under radial pressure and by being varied in composition or degree of vulcanization may be adapted to the weight of the machine on which they are used and to the work which is to be demanded of it as to their cushioning action and the restraint against the lateral displacement of the tire that they may be called upon to exercise.

In the form shown by Fig. 2 of the drawings the tire consists of a simple tube G, having its outer periphery or tread made somewhat thicker than its inner periphery and supported upon a hollow rim H, having a flat bed on which the tire is prevented from rolling by interposing between them on opposite sides of their centers two elastic rubber pads or supports I I, which are secured in place by cementation or in any other suitable manner.

In the construction shown by Fig. 3 of the drawings I have shown a tire J, corresponding to the tire G and supported upon a concavo-convex cushion K, thickened at its ends and resting upon a crescent-shaped hollow rim L, the thickened ends of the cushion virtually forming two elastic pads or supports, respectively located on opposite sides of the center of the tire and rim.

In the construction shown in Fig. 4 of the drawings a tire M, corresponding to the tires G and J, is set into the slightly-concaved bed *m* of a hollow wheel-rim N, having inclined seats *m' m'* at its respective edges, the said seats supporting triangular elastic supports or pads O O, which are thus interposed between the centers of the tire and rim.

Other constructions containing the use in some form of elastic pads or supports interposed between a tire and rim on opposite sides of the centers thereof may be devised, as the foregoing modifications are thought to amply show, and I would therefore have it understood that I do not limit myself to the exact construction herein shown and described, but hold myself at liberty to make such changes and alterations therein as fairly fall within the spirit and scope of my invention.

Having fully described my invention, what I claim as new, and desire to secure by Letters Patent, is—

1. In a wheel, the combination, with a rim and a hollow rubber tire, of elastic pads or supports approximately triangular in cross-section interposed between the same on opposite sides of their centers, substantially as set forth, and whereby the tire is supported laterally and prevented from rolling.

2. In a wheel, the combination, with a rim and a hollow tire, of elastic pads or supports interposed between the same on opposite sides of their centers and narrowing gradually at their outer ends, substantially as set forth.

3. In a wheel, the combination, with a rim having outwardly-inclined seats at its opposite edges and a hollow tire, of elastic pads or supports approximately triangular in cross-section interposed between the tire and the said seats, substantially as set forth.

4. In a wheel, the combination, with a rim having outwardly-inclined seats and a hollow tube, of elastic pads or supports approximately triangular in cross-section interposed between the said seats and the tube on opposite sides of the center thereof, and a wrapping inclosing the tube and pads, substantially as described.

In testimony whereof I have signed this specification in the presence of two subscribing witnesses.

CHARLES E. W. WOODWARD.

Witnesses:
   G. H. POWELL,
   J. W. DOLEN.